United States Patent [19]

Nager, Jr.

[11] 4,446,330

[45] May 1, 1984

[54] ELECTRICAL SERVICE MODULE WITH STRAIN RELIEF MEMBER

[75] Inventor: Urs F. Nager, Jr., Bethel, Conn.

[73] Assignee: Burndy Corporation, Norwalk, Conn.

[21] Appl. No.: 314,964

[22] Filed: Oct. 26, 1981

[51] Int. Cl.³ .............................................. H02G 3/10
[52] U.S. Cl. ................... 174/51; 174/65 R; 174/135; 339/103 M
[58] Field of Search ............... 174/117 F, 117 FF, 51, 174/65 R, 78, 135; 339/103 R, 103 C, 103 M, 107, 14 R, 14 L, 105, 176 MF, 17 F

[56] References Cited

U.S. PATENT DOCUMENTS

| | | | |
|---|---|---|---|
| 2,981,918 | 4/1961 | Gluck et al. | 339/103 M |
| 3,197,729 | 7/1965 | Sarazen | 339/97 |
| 3,337,834 | 8/1967 | Godwin et al. | 339/14 L |
| 4,240,687 | 12/1980 | Bunnell et al. | 339/176 MF X |
| 4,263,474 | 4/1981 | Tennant | 174/84 C |
| 4,351,579 | 9/1982 | Kordes et al. | 339/14 R |

FOREIGN PATENT DOCUMENTS 1151586  5/1969  United Kingdom .............. 339/14 L

OTHER PUBLICATIONS

"AMP-Under Carpet Power System"; Product Bulletin 1602-1, AMP, Inc., Harrisburg, Pa.
"T&B/Versa-Trak Under-Carpet Wiring System/A Modern Method of Electrical Wiring"; Thomas & Betts, Raritan, N.J. (2 Brochures with same Title).
"T&B/Versa-Trak Branch Circuit Wiring for Under-Carpet Installation in Commercial Buildings/Instruction Manual"; Thomas & Betts, Raritan, N.J. (7/31/80).

Primary Examiner—J. V. Truhe
Assistant Examiner—D. A. Tone
Attorney, Agent, or Firm—Howard S. Reiter

[57] ABSTRACT

A service module or fitting for tapping power from a flat conductor cable wiring system for direct use by the consumer is provided with a strain relief feature designed to prevent or reduce force which might be exerted on the cable connections within the module due to outside stresses placed on the wiring system and the protective grounding shield thereon.

4 Claims, 4 Drawing Figures

ELECTRICAL SERVICE MODULE WITH STRAIN RELIEF MEMBER

BACKGROUND OF THE INVENTION

This invention relates to electrical wiring systems utilizing flat conductor cables in lieu of conventional and round wiring systems, and to accessories employed therein.

More particularly, this invention relates to service modules or terminal boxes employed in flat conductor cable wiring systems.

Flat conductor cables, which comprise a plurality of conductive strips embedded in a thin insulating sleeve are finding increasing commercial use in the substitution or replacement of conventional and round wiring systems. By permitting wiring arrangements which may be placed under carpeting and tiling, flat conductor cable systems eliminate the need for extensive behind-the-wall electrical installations, the tacking of wiring to baseboards, and the inclusion of duct work in the walls and floors of buildings under construction which are meant to house conventional wiring systems. Thus, cable systems utilize the floor surface itself as the wiring bed.

Several under-carpet wiring systems have been offered commercially, one of which is the Flexway (trademark of Burndy Corporation) cable wiring system. In these systems, numerous and different types of cable connections are made which are analagous to the several types of connections performed in conventional wiring systems; that is, flat conductor cables are tapped, splice-connected to transition junctions, and connected to service modules or fittings. In a transition connection, a cable is mounted on and connected to an insulating member, from which connections are made to a conventional wiring system. Such transition junctions are normally contained within a conductive metal box or other enclosure which can be opened for access. A service module or fitting is a conductive box or other enclosure in which a flat conductor cable is again mounted and connected to an insulating member, from which power is tapped for direct use by the consumer. An example of this would be a terminal box in which the flat conductor cable is connected to an electrical wall outlet.

For safety considerations, the above mentioned cable systems are installed in three layers: a plastic insulating layer which directly contacts the surface on which the wiring system is to be laid; a middle layer which is the flat conductor cable itself; and a top grounding shield layer, typically comprised of a cold-rolled steel, which is used to ground the entire system. Generally, the lower most plastic insulating layer is of a thickness of several mils to about 25 mils; the thickness of the cable it self depends upon the exact gauge, but generally is of the order of 10 to 25 mils; and the upper grounding shield layer ranges in thickness between 5 and 15 mils. Therefore the total structure remains very thin despite the three-layered composite.

As before mentioned, flat conductor cables are comprised of a plurality of conductive strips which are separated from each other and insulated from each other by, and enclosed within, a thin insulating sleeve which is typically a plastic material, for example, polyester. The conductive strips are usually comprised of copper or a copper alloy, and the number of strips per cable can vary from several to a large number, depending upon the extensiveness of the wiring system contemplated. Taps, splices, transition connections and terminal connections are produced by clamping the conductive portion or portions of the cable or cables to be connected with electrically conductive connectors of various sorts. Squeeze-clamp connectors with teeth which penetrate the cable are in wide use, and a novel cable connection arrangement has been recently been introduced by the Burndy Corporation as part of the above referenced Flexway under-carpet wiring system. This electrical connection arrangement comprises the use of a hollow rivet connector which is made to penetrate the cable and be compressed into an eyelet shape which electro-mechanically secures the cable or cables. The apparatus and method of producing such a novel connection is described in detail in co-pending U.S. Pat. application Ser. No. 314,965 filed of even date, assigned to Burndy Corporation, entitled "Electrical Connection Apparatus and Procedure for Flat Conductor Cables and Other Similar Articles", the entire contents of which application are hereby expressly incorporated herein by reference.

When transition or terminal connections are to be made in a cable system, the cable portion to be tapped or connected is usually mounted on an insulating member which is further mounted within a service module accessible to an electrician. To produce such a connection, the top protective grounding shield is cut away, pulled back, or otherwise removed from the portion of the cable to be accessed. Therefore, with the cable thus mounted on an insulating member, it is clear because of the relative fragility of the constituents of the cable (that is, soft metal and plastic) that any stresses placed upon the module, such as movement of furniture over the wiring system or the general pushing and pulling which occurs when working with the system, could tend to damage the cable connection by pulling the cable away from the connectors and disrupting electrical service throughout the system. It would therefore be desirable to have, and it is a principal object of this invention to provide, a strain relief feature for flat cable conductor wiring system service modules which will prevent or reduce strain caused at the cable connection caused by the exertion of outside forces thereon.

SUMMARY OF THE INVENTION

The above object among others is met by providing in a flat conductor cable service module or transition box a pressure bar member which clamps the plastic-cable-shield structure as it enters the module proximate the insulating mounting means, around which the grounding shield segment may be securely wrapped.

DETAILED DESCRIPTION OF THE INVENTION

Figure 1:
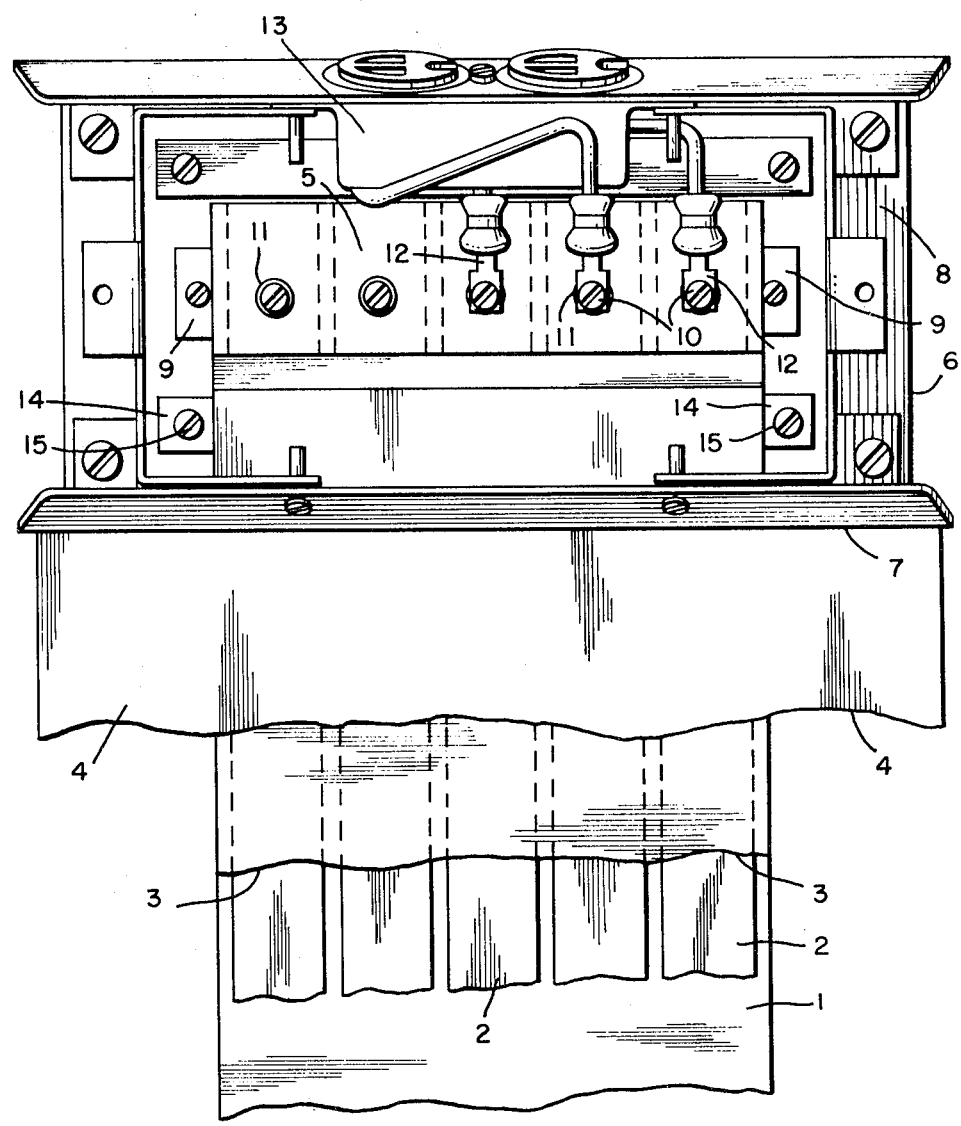
FIG. 1 is a top plan view of a service module in which the flat conductor cable is connected to an electrical wall outlet.

Referring to FIG. 1, with top cover thereon taken away, a service module is viewed from above in which power is tapped from a flat conductor cable to an electrical wall outlet. A cable wiring branch is shown entering the module from the bottom of FIG. 1 and is schematically broken away to show the components thereof. Insulating plastic layer 1 protects the cable from the support surface of the wiring system, for example the floor of a room. The cable itself is comprised of, for example, copper strips 2 (five of these are shown in the illustration) which are separated from each other and enclosed within a thin plastic sleeve at the bottom (not shown) and on the top (layer 3). The top layer is the metal grounding shield strip 4.

Figure 2:
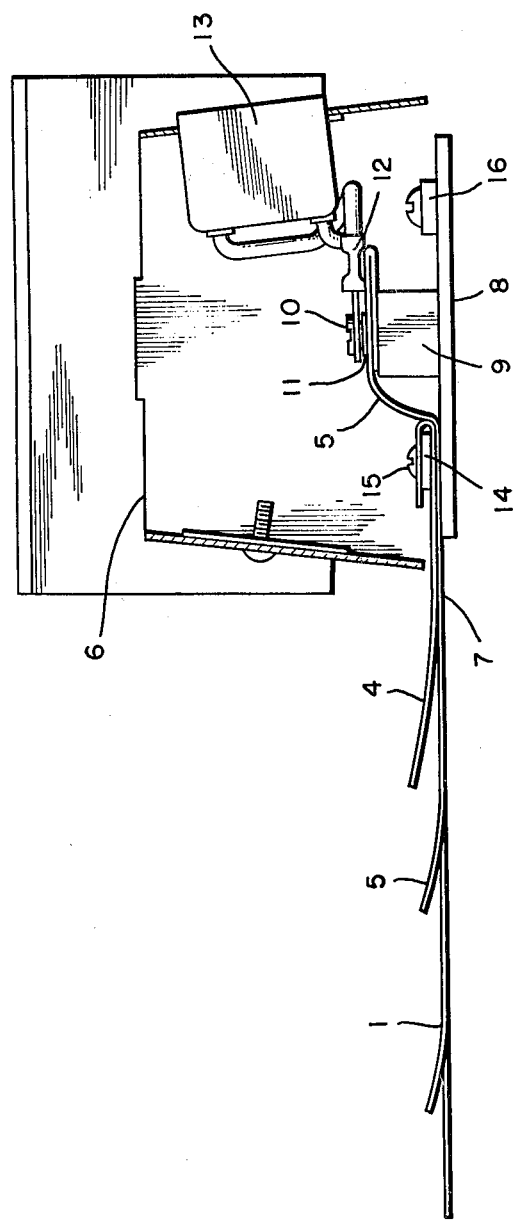
FIG. 2 is a side elevational view of the module shown in FIG. 1 with a top cover mounted thereon.

Referring now to both FIGS. 1 and 2, the flat conductor cable 5 enters the service module 6 through an opening 7 at the base 8 of the module. In FIG. 2, the cable system enters from left to right and the segments 1, 5 and 4 are broken away for illustration purposes only. In order to make the connection, the grounding shield 4 is broken off by any suitable method and folded away from the upper surface of cable 5, and the lowermost plastic insulating layer 1 is either folded away or can remain in contact with cable 5, since the connection can be made through the insulating plastic. The cable is then mounted on an insulating bar member 9, which is comprised of any suitable insulating material such as plastic or hard rubber. The cable is then connected to the insulating bar member, usually by means of screws 10, which are inserted through any suitable electromechanical connector element in order to make the electrical connection. Connectors which can be used are those referred to above; that is, clamp connectors capable of receiving screw members, or the novel riveteyelet connector described in the United States Patent Application incorporated herein above. In fact, in the illustrations herein, that is the type of connector which is depicted. Thus screws 10 are threaded through the riveteyelet connectors 11 which have already made electrical contact with the cable, and the screws are therefore electrically conductive as well as mounted within the insulating bar member 9.

After the cable has been thus electrically and physically connected on the insulating bar means, terminal or transition connections may be made by means of standard circuit connectors, such as, lugs 12 which are placed between the screws 10 and the flange portion of the rivet connectors 11, the lugs of course then being connected to whatever the desired service device or transition circuit may be, such as an electrical wall outlet 13 depicted herein.

The novel feature of the module of this invention is the provision of a strain relief member 14, which is exemplified by a rectangular pressure bar which may be comprised of any suitable conductive material such as metal, in order to maintain the grounding integrity of the wiring system. The exact shape of the pressure bar is not critical and may be rounded as well as rectangular. However, it must be capable of securely clamping the cable system to a fixture of the module, such as the base of the module or a wall thereof, or a bracket affixed to the inside of the module.

Thus, after the cable wiring system has entered the module through opening 7, it is threaded between the pressure bar member and the module structure itself, and the pressure bar member is then securely fastened to the module to securely clamp the wiring system therebetween. Again referring to FIGS. 1 and 2, pressure bar 14 is mounted to the base 8 of the module and secured thereto by adjustable screws 15. The grounding shield strip 4, having been folded away from the cable at the connection area, is then folded across the pressure bar member 14 at least one-half turn, and may be folded a complete turn or turns thereafter. The cable 5 itself is fixed by the pressure bar member and the point of connection in such a way as to leave that portion flexible, that is, under no stress due to either the insulating bar connection or the pressure bar clamping.

Thus, it has been found that if external stresses are exerted on the cable wiring system, the stresses are largely taken up by the protective metal shield strip, acting on the shield at the point where it is wrapped around the pressure bar member 14. Therefore, unless extraordinarily large and unexpected force is exerted on the service module, none of the external forces will be transmitted to the cable itself at the point of connection to the insulating bar. The pressure bar 14, in addition to providing strain relief for the cable, also serves to ground the module and the cable system through the metal shield 4, since the pressure bar member is electrically conductive itself.

Other types of service modules are known; for example, "full feed-through" modules are used for transition connections, in which the cable passes into and out of the module, and is mounted within the module on an insulating bar member for purposes of connection to another wiring or power system. In this particular case, the module would possess two pressure relief members, one on either side of the insulating mounting bar means. For example, referring to FIG. 2, unused pressure bar 16 to the right of the insulating bar means 9 could be utilized if the module were a "full feed-through" module.

Figure 3:
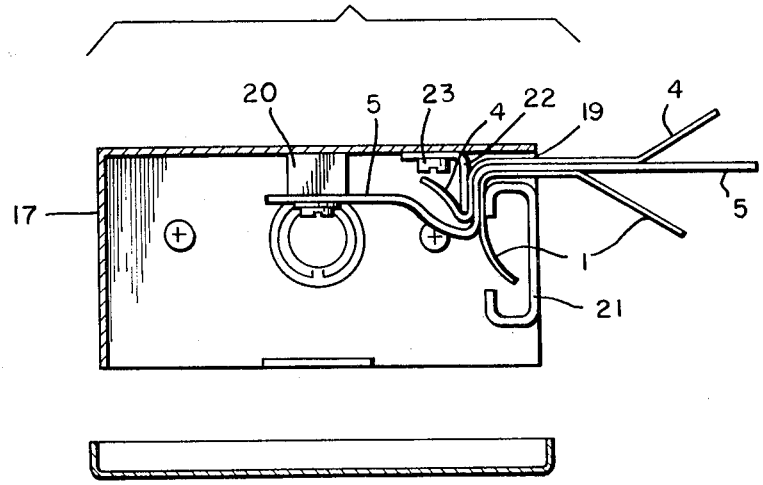
FIG. 3 is a side elevational view of another type of service module, cut away to expose the connection specifics.
Figure 4:
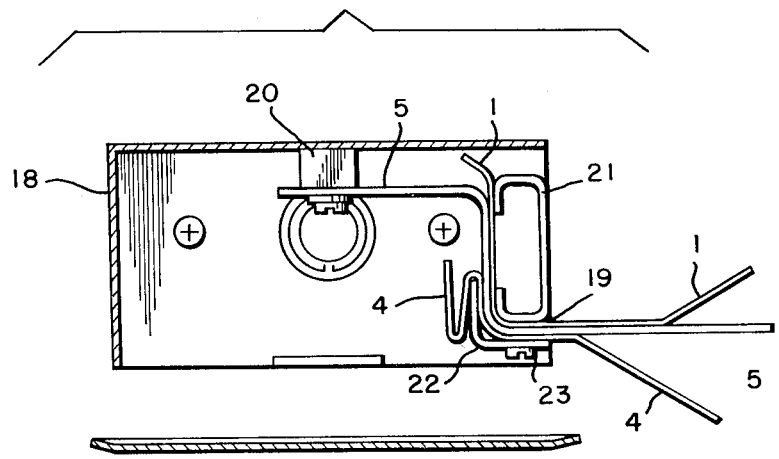
FIG. 4 is a side elevational view of an alternate wiring scheme for the module shown in FIG. 3.

FIGS. 3 and 4 illustrate other module configurations employing the strain relief member of this invention. These modules 17 and 18 will be referred to together since the only appreciable difference between them is the location at which the cable wiring system enters the module. As with the module depicted in FIGS. 1 and 2, modules 17 and 18 are constructed of metallic materials, and thus when the cable system is mounted for connection, it must be mounted on an insulating bar means in order to avoid short-circuiting the wiring system. In any event, the cable wiring system as before consists of plastic insulating layer 1, the cable 5 itself, and the grounding shield strip 4. They enter module 17 and 18 through an opening 19 in the walls thereof, and in the illustrations depicted, both the insulating plastic layer 1 and the grounding shield 4 are folded away from cable 5, which is then secured to insulating bar means 20 by the same means just discussed with respect to FIGS. 1 and 2. However, in this particular case, modules 17 and 18 have brackets 21 permanently fixed to an inside wall. In this case, the strain relief member is in the form of an L-shaped bracket of bar 22, mounted within the modules as shown by means of screws 23. The bar 22 is slotted where fastened by the screw and is thus movable toward or away from module bracket 21. Therefore, the three layered cable wiring system enters the module at 19, and is threaded between pressure bar 22 and bracket 21, pressure bar 22 is then clamped securely against bracket 21 and screws 23 are tightened to make the clamp permanent. Thereafter the cable 5 is loosely guided to the point of connection on the insulating bar means 20, and the broken away segment of the grounding shield strip 4 is folded over the pressure bar 22 in order to insure that it will take any external forces exerted against the wiring system. Since the grounding shield strip is metallic and typically cold-rolled steel, a fold produced therein is a relatively sturdy one.

For example, the invention need not be limited to use with conductive housings, but may be used with plastic housings or other non-conductive housings.

Other variations of the strain relief member disclosed herein will be obvious to those skilled in the art, and accordingly such variations are deemed to be within the scope of this invention.

What is claimed is:

1. An electrical service module in a flat conductor cable wiring system, comprising:
   a. a housing;
   b. an insulating member within the housing for mounting a portion of a flat conductor cable thereon;
   c. a wiring structure extending into the housing which comprises a flat conductor cable and a flat conductive grounding shield;
   d. a clamping member attached to the inside of the housing;
   wherein said wiring structure is confined between said clamping member and a portion of said housing;
   wherein said cable extends from the clamping member to, and is mounted on said insulating member by fasteners which are electrically connected to said cable; and
   wherein the flat conductive grounding shield is terminated within said housing and is at least partially wrapped around said clamping member in a direction opposite to that from which it enters said clamping member.

2. The service module of claim 1 wherein said wiring structure extends into said housing at one end thereof, passe through said housing and exits said housing at another portion thereof;
   wherein said flat conductive shielding strip is interrupted within said housing;
   said module further comprising a second clamping member attached to the inside of the housing, on the side of the insulating member opposite that at which the first clamping member is located;
   wherein said exiting wiring structure is confined between the second clamping member and a portion of said housing;
   and wherein the exiting portion of said flat conductive strip is at least partially wrapped around the second clamping member in the same direction is which said strip exits the housing.

3. The module of claim 1 wherein said clamping member is of a width at least equal to the width of said flat conductor cable.

4. The module of claim 2 in which said clamping members are of a width at least equal to the width of said flat conductor cable.

* * * * *